A. DAGOSTENO.
SAFETY BRAKE.
APPLICATION FILED AUG. 9, 1919.

1,343,116.

Patented June 8, 1920.
2 SHEETS—SHEET 1.

WITNESS:
L. B. James

Augustine Dagosteno INVENTOR.
BY
Victor J. Evans
ATTORNEY.

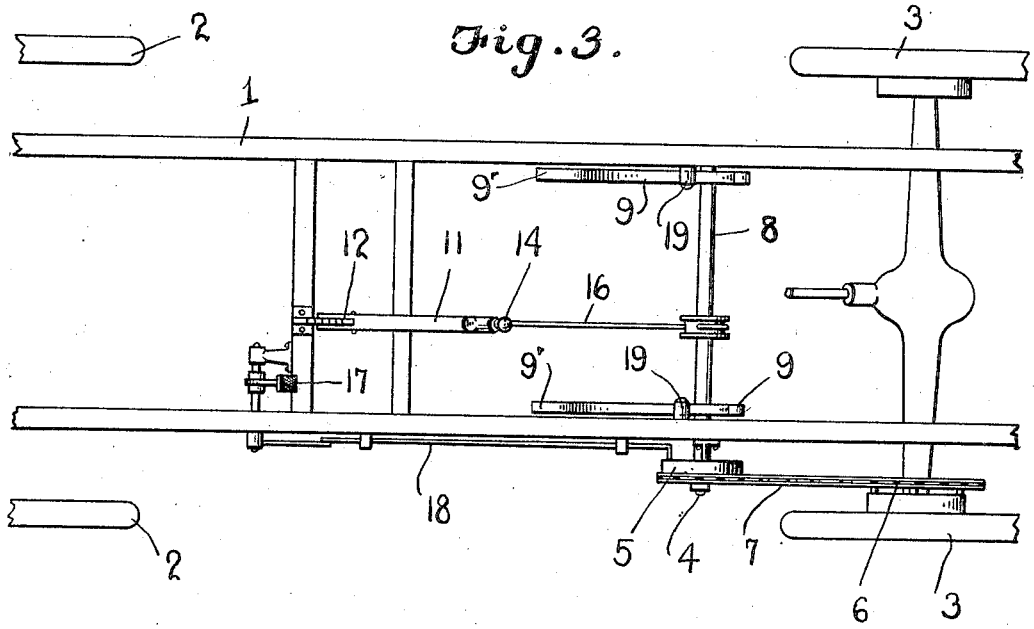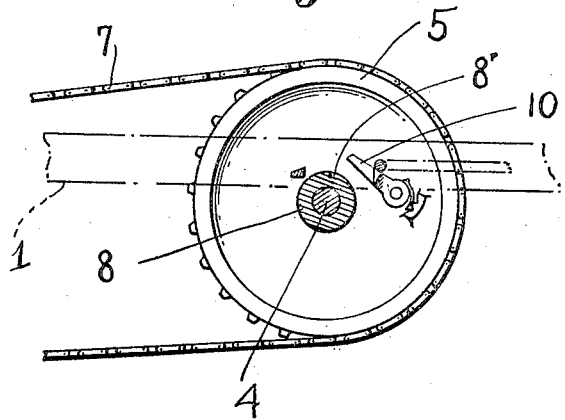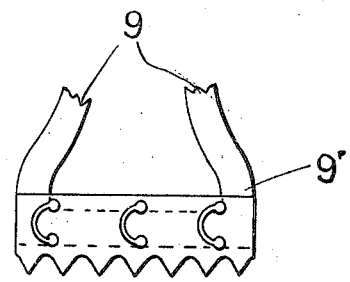

UNITED STATES PATENT OFFICE.

AUGUSTINE DAGOSTENO, OF NEW YORK, N. Y.

SAFETY-BRAKE.

1,343,116.  Specification of Letters Patent.  Patented June 8, 1920.

Application filed August 9, 1919. Serial No. 316,417.

*To all whom it may concern:*

Be it known that I, AUGUSTINE DAGOSTENO, a citizen of the United States, residing at New York, in the county of New York and State of New York, have invented new and useful Improvements in Safety-Brakes, of which the following is a specification.

This invention relates to a safety brake for automobiles and the like, and the principal object of the invention is to provide means for lifting the rear wheels of the automobile off the ground so that said wheels will be prevented from driving the vehicle.

Another object of the invention is to provide means whereby the lifting member may be easily and quickly lowered into operative position by striking a spring controlled member with the hand.

Still another object of the invention is to provide simple foot operated means for restoring the parts to their inoperative position.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Fig. 3 is a section on line 3—3 of Fig. 2.

Fig. 4 is a section on line 4—4 of Fig. 3.

Fig. 5 is a detail view.

Figure 1:
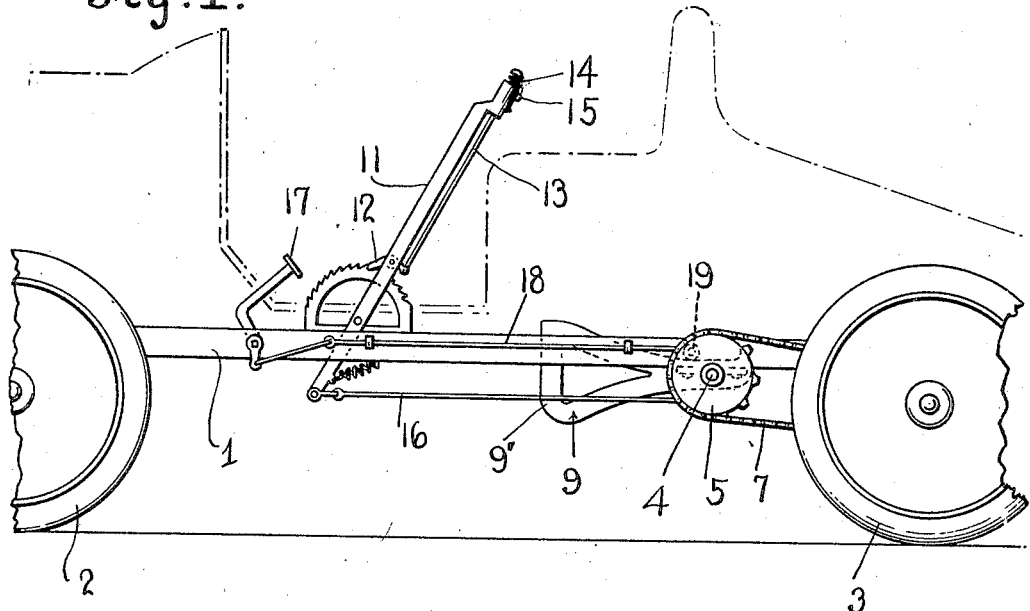
Figure 1 is a side view of a portion of an automobile supplied with my invention.
Figure 2:
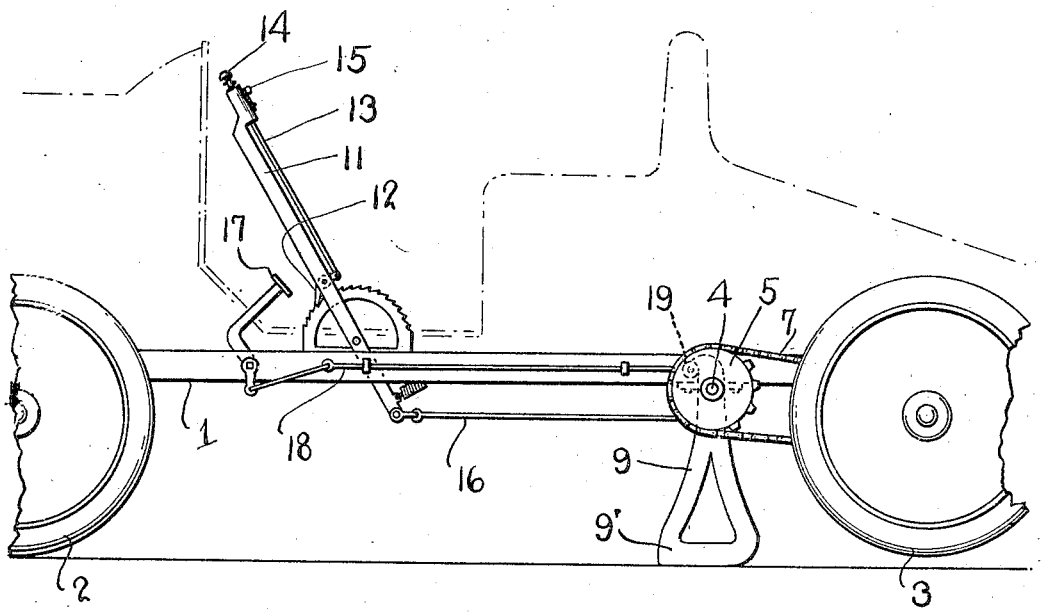
Fig. 2 is a like view with the breaking member in braking position.

In these views 1 indicates the frame of the automobile, 2 the front wheel and 3 the rear wheel. These rear wheels are driven in the usual manner from the motor.

In carrying out my invention I provide a shaft 4 in front of the rear wheels and I mount a chain wheel 5 on this shaft and connect this wheel with a like wheel 6, connected with the rear shaft, by the chain 7. A sleeve 8 is loosely mounted on the shaft 4 and the braking member 9 is connected with the said sleeve. As shown in the drawings this braking member is provided with an enlarged head 9' which is adapted to engage with the ground or road surface when in braking position. The sleeve 8 is provided with a notch 8' which is adapted to be engaged by a dog 10 carried by the wheel 5. This dog is normally held out of engagement with the notch by a spring or the like. It will thus be seen that as long as the dog is out of engagement with the notch the wheel 5 will rotate without moving the sleeve or braking member.

A hand lever 11 is suitably located on the automobile in a position where it may be easily grasped by the driver. The hand lever is provided with the usual dog and ratchet mechanism 12, the dog is connected by a rod 13 with a spring controlled hand operated plunger 14 carried by the top of the lever. The plunger when pushed down by the hand will be held in its lowest position by the catch 15. The lower end of the lever is connected with the braking member 9 by the connection 16 in such a manner that when said lever is in one position the said member will be in raised position and when said lever is pushed over into its other position the braking member will be permitted to drop by gravity.

It will thus be seen that when a sudden stop is to be made it will simply be necessary to strike the plunger 14 with the hand to release the dog so that the hand lever will move to its forward position, thus permitting the braking member to drop and thus raise the rear wheels of the machine off the ground. In this way the automobile is immediately stopped as its driving wheels are not in contact with the road surface and the frictional engagement of the braking member with the road surface will stop the forward movement of the machine.

The means for raising the braking member consists of a foot pedal 17 which is adapted to move a rod 18 so that its free end will strike the dog 10 and move it into engagement with the notch so as to connect the sleeve 8 and the braking member with the chain wheel 5. Then the rear wheels are reversely rotated thus causing the parts to lift the braking member into inoperative position and said member is held in this position by moving the hand lever to its retracted position. I provide a pin 19 having a rubber collar thereon for preventing the braking member from being moved too far.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with an automobile, a supplemental shaft journaled in the frame thereof, a lifting member pivoted on said shaft and adapted to engage the road surface to lift the rear wheels off said surface, a gear wheel on said supplemental shaft, means for driving the same from the rear wheels, clutch means for connecting said gear wheel with the lifting member, a hand operated means for holding the said member in inoperative position, and manually operated means for shifting the clutch.

In testimony whereof I affix my signature.

AUGUSTINE DAGOSTENO.